Figure 4:
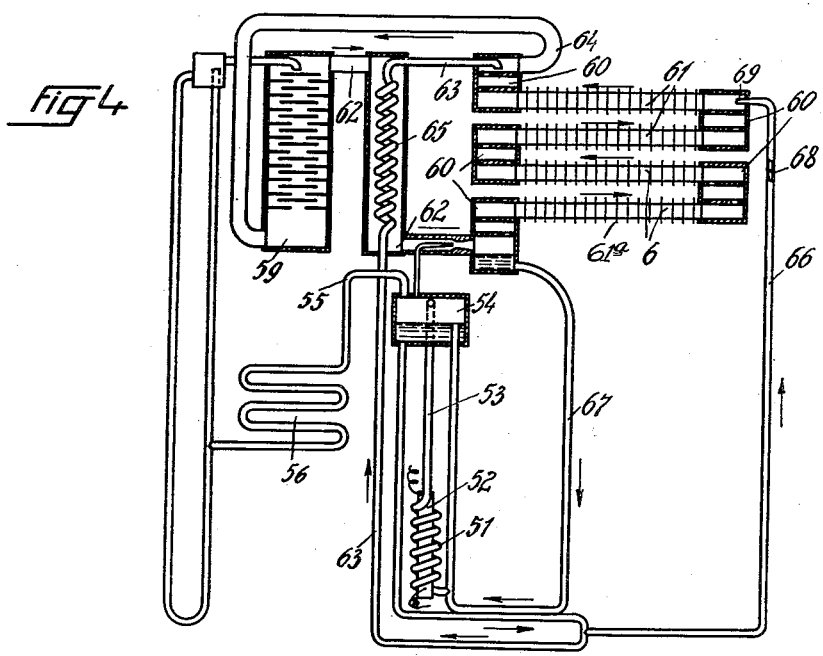

Dec. 5, 1933.  E. ALTENKIRCH  1,938,166
CONTINUOUS ABSORPTION REFRIGERATING MACHINE
Filed Feb. 15, 1929  3 Sheets—Sheet 1
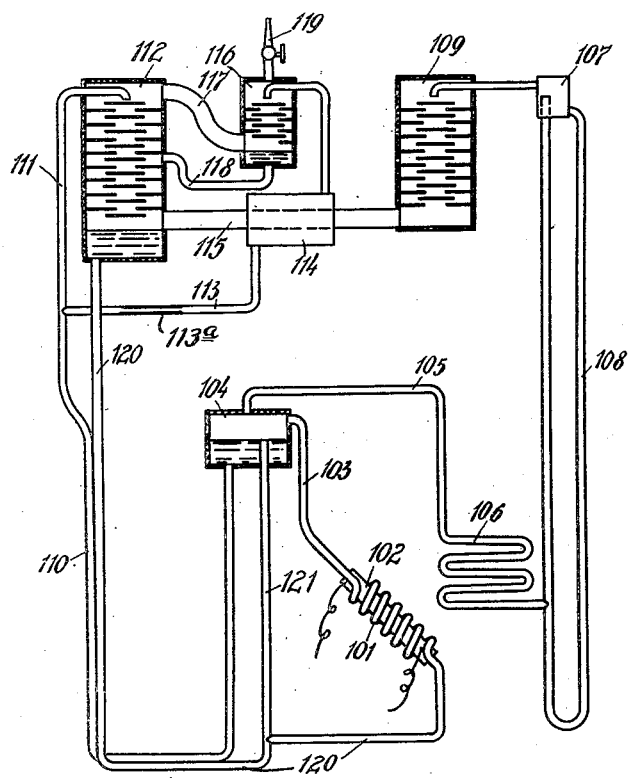
Inventor
Edmund Altenkirch
by Knight Bz
attorneys

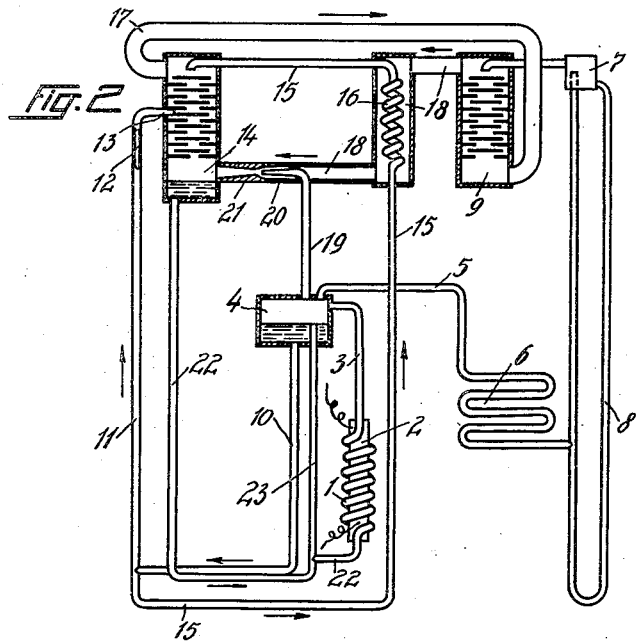
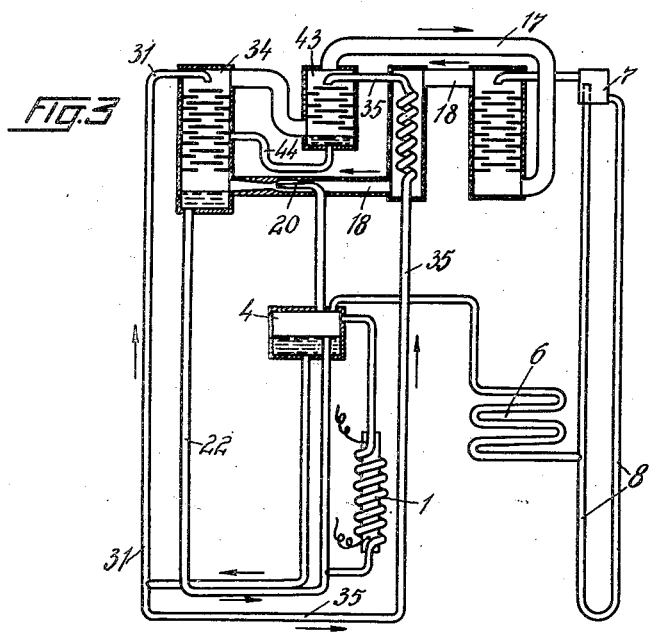

Dec. 5, 1933.    E. ALTENKIRCH    1,938,166
CONTINUOUS ABSORPTION REFRIGERATING MACHINE
Filed Feb. 15, 1929    3 Sheets-Sheet 3

Inventor
Edmund Altenkirch
by Knight Bro
attorneys

Patented Dec. 5, 1933

1,938,166

UNITED STATES PATENT OFFICE 1,938,166

CONTINUOUS ABSORPTION REFRIGERATING MACHINE

Edmund Altenkirch, Neuenhagen, near Berlin, Germany, assignor, by mesne assignments, to The Hoover Company, North Canton, Ohio, a corporation of Ohio Application February 15, 1929, Serial No. 340,100, and in Germany February 22, 1928

20 Claims. (Cl. 62—119)

My invention relates to improvements in continuous absorption refrigerating machines.

In machines of this type it is well known to precool the impoverished solution flowing from the generator to the absorber, for instance by a temperature interchange, by cooling water or the like and then to allow it to enter the absorber at the thus reduced temperature.

According to my invention the impoverished absorption solution, which might have been precooled in the manner described, is prior to its entry into the absorber subdivided into a plurality of branch currents which are introduced into the absorber at different temperatures and at different points.

This results in a number of important advantages. The heat developed in the absorber may, for instance, be used to reheat a branch current of the already cooled solution and to employ it for the production of a zone of particularly high temperature in the absorber. This may be useful to obtain a particularly good utilization of the waste heat of the absorber for other purposes (for instance for expelling gas from an absorption solution). It is, however, of particular advantage to cool one of the branch currents more than the other or others, for which purpose the working medium already evaporated or still to be evaporated may, for instance, be used, which medium flows from the evaporator to the absorber. By correctly dimensioning the volume of the branch current, the cooling of this part of the solution may be carried to a very low temperature, while by using the same means for precooling the entire impoverished solution, its temperature could be lowered to only a very small extent.

The branch current of the precooled solution, which is introduced at this lower temperature into the absorber at a point specially selected for the purpose may, for instance in machines from which gas is to be removed during operation, serve to free the gas to be removed particularly thoroughly from the working medium. This is of value in continuous absorption refrigerating machines of various kinds, for those which work with pumps for the liquids as well as for those in which the pressure difference between absorber and generator is maintained by columns of liquid. The precooling of the branch current of the impoverished solution is of advantage in such machines also, which operate with a gas admixture at or above atmospheric pressure and which are in communication with the atmosphere by a pressure maintaining device. If in such machines an undesired gas development occurs for any reason and thus an increased excess pressure, so that the excessive gas is ejected, an extensive absorption of the working medium may be provided for by means of the precooled branch current of the impoverished solution and in this way the escape of the working medium into the surrounding air may be limited to a minimum.

The division of the impoverished solution with increased precooling of one of its branch currents is very advantageous more particularly in absorption machines, in which between absorber and evaporator an inert pressure equalizing gas circulates. In such machines it is possible to precool the branch current in question by the gas mixture coming from the evaporator, whereby it becomes particularly easy to very thoroughly free the gas mixture, leaving the absorber, of the working medium. In this way it is possible to increase the production of cold correspondingly or to obtain particularly low temperatures in the evaporator.

It may suggest itself to cool the entire impoverished solution, instead of only a portion thereof, prior to its entry into the absorber by a gas mixture coming from the absorber. In absorption machines with gas circulation the cold available for the precooling of the solution is greater than in other continuous absorption machines. In spite of this fact the desired object would in most cases not be attained with certainty, because if the quantity of liquid circulating between the generator and the absorber is large in relation to the quantity of gas mixture flowing from the evaporator to the absorber, which may be advantageous for several reasons, only very slight cooling of the undivided impoverished solution below the temperature of the cooling medium could be attained. If on the other hand the cooling of the impoverished solution is only slight, it is not possible to free the gas mixture leaving the absorber sufficiently from the undesirable admixtures. This disadvantage would become particularly prominent, if the absorber were cooled by air and if in consequence of unfavorable cooling conditions the gas mixture is particularly warm and rich in cooling medium and vaporous solvent.

If, on the other hand, in absorption machines with gas mixture circulation according to my invention not the entire absorption solution but only a portion of it is precooled by the gas mixture coming from the evaporator, a much more thorough separation of the gas mixture from the working medium can be attained, particularly if according to another feature of my invention the precooled branch current of the impoverished solution is allowed to enter the absorber near the point where the gas mixture escapes from it.

In the drawings affixed hereto and forming part of my specification various embodiments of my invention are illustrated diagrammatically, by way of example.

In these drawings

Fig. 1 illustrates an absorption refrigerating machine working without an auxiliary gas, and Figs. 2 to 5 absorption refrigerating machines of the type in which a pressure equalizing gas circulates between the absorber and the evaporator.

Referring to Fig. 1 of the drawings, 101 is the generator consisting of an inclined coiled pipe adapted to be heated by an electric heating rod 102, which generator by an ascending pipe 103 is in communication with the rectifier chamber 104. From this chamber the gaseous working medium, such as ammonia, passes through a pipe 105 to the condenser 106, where it is condensed. The condensate passes through a vessel 107, which is connected by a U-shaped pressure maintaining pipe 108 with the condenser 106, into the evaporator 109 at its upper end. A portion of the impoverished absorption solution, separated in the rectifier 104 from the gaseous working medium and drained through a pipe 110, is conducted by means of a pipe 111 branching off the pipe 110, into the absorber 112, entering it near its upper end. The other portion of the impoverished solution flowing through pipe 110 passes through a pipe 113 likewise branching off the jacket 110 into a pipe 114, which encloses the gas pipe 115 leading from the evaporator 109 to the absorber 112, and thence into the upper portion of a smaller auxiliary absorber 116, which is in communication with the main absorber 112 through a gas pipe 117 which conducts unabsorbed gas into the auxiliary absorber in counterflow with the impoverished absorption solution supplied through pipe 113. The auxiliary absorber 116 further communicates with the main absorber through a liquid pipe 118, which drains the enriched absorption liquid collecting at the bottom of the auxiliary absorber into the main absorber midway between the ends of the latter. The auxiliary absorber 116 is at its upper end provided with a venting device 119, which serves to discharge any foreign gases existing in the absorber system. The main absorber 112 is connected by a pipe 120, with the lower end of generator 101 and serves for the return of the enriched solution to the latter. Pipe 120 is placed closely adjacent to the aforementioned pipe 110 with which it forms a heat interchange device. A branch pipe 121 leads from the pipe 120 to the rectifier chamber 104, in where it terminates at the height of the level of the liquid indicated. This branch pipe, which in normal operation is only partly filled with rich absorption solution, serves for the reception of any excess quantities of impoverished solution in the rectifier chamber 104 and for conveying them through the pipe 120 into the generator 101 together with the rich solution coming from the absorber 112. The dimensions of the pipes 111 and 113 are, in view of the intended ratio in size of the two branch currents, dimensioned so, that the larger portion of the liquid passes through the pipe 111 into the main absorber 112 and an accurately predetermined smaller portion of the liquid through the pipe 113 into auxiliary absorber 116. This is indicated in Fig. 1 for example by a restricted portion 113ª in pipe 113. The last mentioned branch current is subjected to a very strong cooling, while passing through jacket 114, by the very cold gas flowing from the evaporator 109 through gas pipe 115. This branch current of the impoverished absorption liquid is thus able to absorb the gaseous working medium, such as ammonia, passing through pipe 117 into the absorber 116. In this absorber is thus formed above the level of the liquid a mixture enriched with foreign gases, which can be discharged by means of the venting device 119.

The embodiments of my invention illustrated in Figs. 2 to 5 are applied to absorption machines of the type in which a pressure equalizing gas circulates between absorber and evaporator. In other respects these modifications correspond with the system illustrated in Fig. 1 of the drawings.

Referring to Fig. 2 it will be seen that the vertical generator 1 adapted to be heated by the electric heating rod 2 is in communication with the rectifier chamber 4 by the ascending pipe 3. From here the gaseous working medium passes through the pipe 5 to the condenser 6. The condensate passes through the vessel 7 and the pipe 8 into the evaporator 9. A large portion of the impoverished absorption solution separated from the working medium in the rectifier 4 and discharged through a pipe 10 is conducted into the absorber 14 by means of a branch pipe 11, and flows after passing through a filter 12 through a tapering nozzle 13 into the absorber 14 at about the middle of its height. The remaining smaller portion of the impoverished solution passes through a pipe 15, likewise branching off the pipe 10, and a coil 16 into the absorber 14 at the top closely adjacent to the point where the auxiliary gas circulating between the evaporator 9 and the absorber 14 issues from the absorber in order to be returned through a pipe 17 into the evaporator at its bottom end. The coiled pipe 16 is located in a jacket 18 through which the gas mixture returns from the evaporator 9 to the absorber 14 by way of pipe 18ª. Thereby a heat interchange in counter flow takes place here between the smaller branch current of the impoverished solution and the gas mixture. The circulation of the gas mixture is started by a gas jet emanating from a nozzle 20, which is in communication with the gas space of the rectifier 4 through a pipe 19 and which is arranged in the gas pipe 18ª leading to the absorber in such a manner, that the heat interchange between the poor solution and the gas mixture takes place prior to the entry of the latter into the diffusor 21 of the nozzle 20.

For returning the solution enriched in the absorbed 14 to the generator 1 there is provided a U-shaped pipe 22, which is disposed to form a heat interchanging device with pipe 10 conducting impoverished solution from rectifier 4. From the pipe 22 branches off a pipe 28 which terminates in the rectifier chamber 4 at the height of the level of the liquid.

In consequence of the throttling action upon the two branch currents of the impoverished solution set up by the nozzle 13 at the end of the pipe 11 as well as by the different dimensions of the pipes 11 and 15, the quantity proportion between the branch current in the pipes 11 and 15 may be regulated in such a way, that the larger portion of the liquid reaches the absorber 14 through the pipe 11 and an accurately predetermined smaller portion through the pipe 15.

Since the last mentioned smaller portion traversing the coil pipe 16 is subjected to a vigorous cooling action in the jacket 18 through which very cold gas mixture passes on its way from the evaporator to the absorber, it is able to free the gas mixture passing through the absorber 14 thoroughly from the gaseous working medium (for instance ammonia) and at the same time also from entrained steam. Consequently only dry gas poor in working medium returns into the evaporator 9, whereby the absorption machine is rendered capable of producing cold at a very low temperature. The drain pipe for the evaporator has been omitted in the drawings for the sake of simplicity.

The modification illustrated in Fig. 3 of the drawings differs from the last described one merely by the absorber being subdivided into two parts 34 and 43 of unequal size located one behind the other in the direction of the circulation of the gas mixture, and that the pipe 31 conducting the larger branch current opens into the larger or main absorber 34 at the top, and the pipe 35 conducting the smaller branch current opens into the smaller or auxiliary absorber 43 at the top, similar to the manner shown in Fig. 1. A pipe 44 connecting the two absorbers 34 and 43 and forming a liquid seal takes care that the rich solution formed in the absorber 43 is able to drain into the main absorber 34. The system illustrated in Fig. 3, which is otherwise arranged and operates in a manner similar to that shown in Fig. 2, has in comparison with the latter the special advantage, that the area available for the absorption is increased although the height of the machine remains the same.

In the modification illustrated in Fig. 4, 51 is the generator adapted to be heated by the electric heating rod 52, 53 the ascending pipe conveying in customary manner the liquid by means of expelled gas bubbles into the rectifier or gas separating chamber 54, 56 the condenser in communication with the rectifier 54 by means of the pipe 55 and 59 the evaporator. The absorber consists here of five vessels 60 of equal capacity and located alternately at different levels, which are connected with each other by long pipes 61 of considerable diameter. Through these pipes flows the gas mixture coming from the evaporator 59 as well as the absorption solution flowing in the opposite direction, which solution after being precooled in coil 65, located in jacket 62 which in turn is interposed in the gas passage between the evaporator and the absorber, is discharged into the absorber at the upper end of the uppermost vessel 60 through the liquid conveying pipe 63. This pipe which contains the aforementioned coil 65 receives the impoverished solution from the rectifier or gas separator 54. In close proximity to the discharge opening of the pipe 63 into the absorber is connected to the absorber the gas discharge pipe 64, through which the gas mixture is conducted from the absorber to the lower part of the evaporator 59. While the smaller branch current of the impoverished absorption solution, which traverses the pipe 63 and the coiled pipe 65 inserted into it, opens into the uppermost vessel of the subdivided absorber 60, the heavier branch current is discharged into the upper end of the next lower vessel of the absorber 60 by means of a pipe 66 provided with a filter 68 and a tapering nozzle 69. The pipe 67 which connects the lowermost vessel of absorber 60 with the lower end of the generator 51 serves for the discharge of the enriched absorption solution into the generator. Pipe 67, as shown, is disposed in heat exchanging relation with a portion of pipe 63.

This last described arrangement facilitates a particularly efficient heat interchange between the absorber or the gas mixture traversing it and the surroundings. If it is desired to discharge the heat by cooling water, for instance, the pipes 61 may be enveloped by cooling jackets. In case of air cooling the pipes 61 are preferably provided with gills or fins 61ª. Both of these means per se are conventional and well known expedients.

Figure 5:
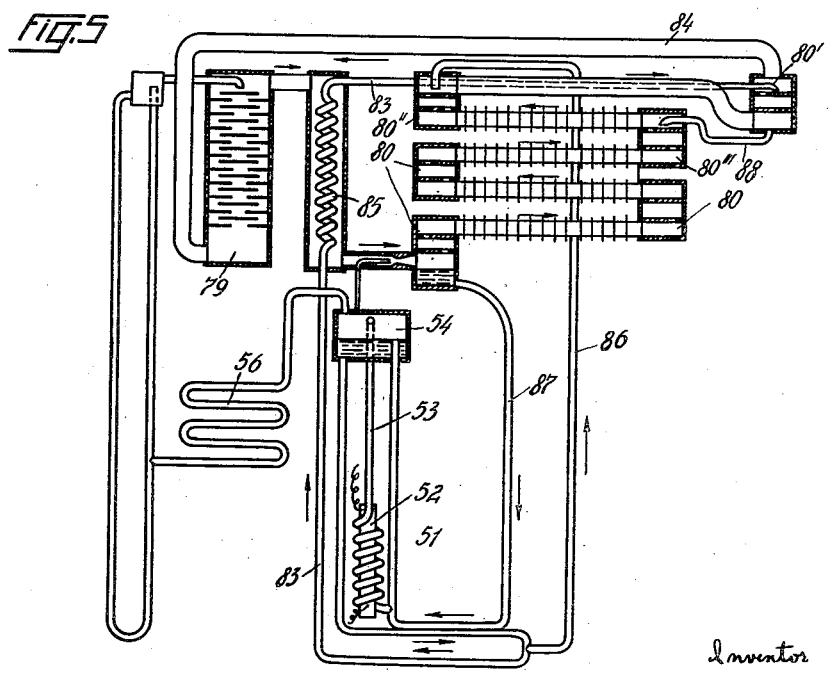

The embodiment illustrated in Fig. 5 corresponds substantially with the construction shown in Fig. 4, with the only difference that the absorber 80 consists here of six individual vessels, and that the vessel, to which is joined the gas conveying pipe 84 leading to the evaporator is located at the same height as the uppermost of the five remaining vessels. The smaller branch current of the absorption solution, supplied from the rectifier 54 by a pipe 83 and precooled in the coiled pipe 85 by the gas mixture coming from the evaporator 79, is discharged into the absorber vessel 80' closely adjacent to the point of discharge of the gas mixture from this vessel, while the other larger branch current of the absorption solution flows into the absorber vessel 80'' through a pipe 86 at the same height, the latter pipe being branched off the aforementioned pipe 83. The absorption solution enriched in vessel 80' flows into the next lower vessel 80''' through a pipe 88 forming a liquid seal. The rich absorption solution is finally returned to the generator 51 from the lowest vessel of absorber 80 through a pipe 87, part of which, as in Fig. 4, stands in heat exchange relation with part of pipe 83.

The last described system compared with the preceding one has the advantage, that due to the arrangement of the first absorption vessel 80' at the same level as the second vessel 80'' the absorber and thus the entire absorption machine may be reduced in height.

In the modifications illustrated in Figs. 2 to 5 liquid, which may penetrate into the gas mixture pipe leading from the evaporator to the absorber and standing in heat interchange with a branch current of the impoverished solution is able to flow directly into the liquid space of the absorber. It would, of course also be possible to lead the gas mixture pipe mentioned in such a way, that its lowest point is located above the level of the liquid in the absorber, but below the evaporator. In this case it would be necessary to connect the lowest point of the pipe conveying the gas mixture with the absorber by a special drain pipe.

If the absorber is enveloped by a jacket traversed by a cooling liquid, it is important that the pipes for the branch currents of the impoverished solution be so conducted into the absorber, that any heat interchange with the cooling liquid is avoided, because otherwise the advantage would be partly lost again which can be obtained by the heat interchange with the gas mixture.

Various modifications and changes may be made without departing from the spirit and the scope of the invention.

I claim as my invention:

1. The method of increasing the absorption of a refrigerant vapor in an absorption liquid in an absorption refrigerating system having an evaporator, an absorber and means for circulating an auxiliary pressure equalizing agent between said evaporator and absorber which includes the steps of absorbing a portion of the refrigerant vapor by bringing a quantity of absorption liquid at a given temperature into engagement with said vapor in the absorber, cooling another quantity of absorption liquid by causing an exchange of heat between it and the auxiliary pressure equalizing agent circulating between the absorber and evaporator and bringing the cooled quantity of absorption liquid into engagement with the remainder of said refrigerant vapor.

2. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes being adapted to conduct impoverished absorption solution from the generator to the absorber and including a plurality of branches for the purpose of conducting branch currents of the absorption solution, said branches opening into said absorber at different points, and means for causing said branch currents to enter said absorber at different temperatures.

3. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed, and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, one of said branch pipes being in heat interchange with said pipe conducting the evaporated working medium from said evaporator to said absorber.

4. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed, and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, one of said branch pipes being in heat interchange with said pipe conducting the evaporated working medium from said evaporator to said absorber, said branch pipe conducting a branch current of the impoverished absorption solution which is smaller than the other branch currents.

5. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes being adapted to conduct impoverished absorption solution from the generator to the absorber and including a plurality of branches for the purpose of conducting branch currents of the absorption solution, said branches opening into said absorber at different points, and means for causing said branch currents to enter said absorber at different temperatures, the admission openings of said branches into said absorber being located at points which in regard to the flow of the evaporated working medium are arranged in series with one another.

6. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, one of said branch pipes being in heat interchange with said pipe conducting the evaporated working medium from said evaporator to said absorber, said branch pipe opening into said absorber adjacent to the point where non-absorbed gases leave said absorber.

7. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, one of said branch pipes being in heat interchange relation with the pipe conducting the evaporated working medium from the evaporator to the absorber, said absorber consisting of a plurality of vessels connected in series with regard to the flow of the gas.

8. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, one of said branch pipes being in heat interchange relation with the pipe conducting the evaporated working medium from the evaporator to the absorber, said absorber consisting of a plurality of vessels connected in series with regard to the flow of the gas, said branch pipes conducting the branch currents opening into different portions of said absorber located at equal heights.

9. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, and means for throttling some of the individual branch currents for the purpose of controlling their quantity ratios to the other branch currents.

10. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for dividing the absorption solution into a plurality of branch currents, said branch pipes opening into said absorber at different points, said branch currents entering said absorber at different temperatures, and means for throttling some of the individual branch currents for the purpose of controlling their quantity ratios to the other branch currents, said individual branch currents being throttled to a different extent.

11. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for dividing the absorption solution into a plurality of branches, said branch pipes opening into said absorber at different points, said branch currents entering said absorber at different temperatures, and means for throttling some of the individual branch currents for the purpose of controlling their quantity ratios to the other branch currents, said individual branch currents being throttled to a different extent, said throttling action being effected by correspondingly dimensioning the pipes with respect to their lengths and internal diameters.

12. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, one of said branch pipes being in heat interchange relation with the pipe conducting the evaporated working medium from the evaporator to the absorber, the impoverished solution and the gas stream being conducted in counterflow to each other.

13. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, charging device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, said evaporator and absorber containing an inert auxiliary gas, circulating through them, the colder branch current of the absorption solution entering said absorber close to the point where the gas mixture (gaseous working medium and auxiliary gas) returns from the absorber to the evaporator.

14. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, said evaporator and absorber containing an inert auxiliary gas circulating between them, means for cooling one of the branches of the solution by the gas returning from the evaporator to the absorber, the colder branch current of said solution entering said absorber close to the point where the gas mixture (gaseous working medium and auxiliary gas) returns from the absorber to the evaporator, and a pipe conducting gaseous working medium and terminating in a nozzle for blowing a gas jet into said gas mixture for effecting the circulation of said inert auxiliary gas, the heat interchange between the impoverished absorption solution branch and the gas mixture being located in front of the point where the gaseous working medium enters the gas mixture through said nozzle.

15. In an absorption refrigerating machine containing an absorption solution, in combination, a generator for generating gaseous working medium from said absorption solution, a device for changing the expelled working medium to a condition from which it is subject to evaporation, an evaporator for evaporating the medium so changed and an absorber for the absorption of evaporated medium in the absorption solution, pipes for interconnecting said generator, changing device, evaporator and absorber, one of said pipes conducting impoverished absorption solution from the generator to the absorber and branching into a plurality of pipes for the purpose of conducting branch currents of the absorption solution, said branch pipes opening into said absorber at different points, said branch currents entering said absorber at different temperatures, said evaporator and absorber containing an inert gas circulating between them, means for cooling one of the branches of the solution by the gas returning from the evaporator to the absorber, the colder branch current entering said absorber close to the point where the gas mixture (gaseous working medium and auxiliary gas) returns from the absorber to the evaporator.

16. In continuous absorption refrigerating apparatus, an evaporator, a plurality of absorbers, gas conduit means for conveying refrigerant gas from the evaporator to one absorber and then into the other absorber, means for supplying absorption liquid to each of said absorbers and means for cooling the absorption liquid supplied to one of said absorbers by the gas in said conduit means to a temperature lower than that of the absorption liquid supplied to the other of said absorbers.

17. In continuous absorption refrigerating apparatus, in which an auxiliary agent is employed as a pressure equalizing medium, a large absorber, a small absorber, means for causing a mixture of refrigerant vapor and auxiliary agent to pass through said large absorber and then into said small absorber and means for supplying absorption liquid of a different temperature to each of said absorbers.

18. In continuous absorption refrigerating apparatus, an evaporator, an absorber gas conduit means for conveying refrigerant gas from the evaporator to said absorber, means for supplying absorption liquid to said absorber at different parts thereof and means for cooling one of said liquid supplies by the gas in said conduit means for maintaining the absorption solution supplied to one absorber part at a different temperature from that supplied to another part to increase the effectiveness of the absorption of the refrigerant gas in the absorber.

19. In continuous absorption refrigerating apparatus, a plurality of absorbers, an evaporator, means for circulating an auxiliary pressure equalizing agent between the absorbers and said evaporator to convey a refrigerant vapor from the evaporator to the absorbers, means for supplying an absorption liquid to said absorbers and means for causing an exchange of heat between the auxiliary pressure equalizing agent and the absorption liquid supplied to one of said absorbers before said fluid enters the absorber.

20. The method of increasing the absorption of a refrigerant vapor in an absorption liquid in a continuous absorption refrigerating system, which includes the steps of absorbing a portion of said vapor by bringing a quantity of absorption liquid at a given temperature into engagement therewith, cooling another quantity of absorption liquid by the refrigerant vapor supplied to the first liquid quantity, and bringing said other quantity of absorption liquid at a lower temperature into engagement with the vapor not absorbed by the first mentioned quantity of absorption liquid.

EDMUND ALTENKIRCH.